(12) United States Patent
Ceylan et al.

(10) Patent No.: US 9,922,443 B2
(45) Date of Patent: Mar. 20, 2018

(54) TEXTURING A THREE-DIMENSIONAL SCANNED MODEL WITH LOCALIZED PATCH COLORS

(71) Applicant: Adobe Systems Incorporated, San Jose, CA (US)

(72) Inventors: Duygu Ceylan, Mountain View, CA (US); Nathan Carr, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 146 days.

(21) Appl. No.: 15/142,849

(22) Filed: Apr. 29, 2016

(65) Prior Publication Data

US 2017/0316597 A1    Nov. 2, 2017

(51) Int. Cl.
*G06T 15/04*    (2011.01)
*G06T 17/10*    (2006.01)

(52) U.S. Cl.
CPC .............. *G06T 15/04* (2013.01); *G06T 17/10* (2013.01)

(58) Field of Classification Search
None
See application file for complete search history.

(56) References Cited

U.S. PATENT DOCUMENTS

| | | | |
|---|---|---|---|
| 9,747,516 B2 * | 8/2017 | Wagner | G06K 9/4671 |
| 2002/0061194 A1 * | 5/2002 | Wu | G03B 35/00 |
| | | | 396/324 |
| 2016/0027152 A1 | 1/2016 | Hsieh et al. | |
| 2017/0018088 A1 * | 1/2017 | Jeong | G06T 15/04 |

OTHER PUBLICATIONS

Delong, Andrew, et al., "Fast Approximate Energy Minimization with Label Costs", Computer Vision and Pattern Recogniton (CVPR), San Francisco, Jun. 2010, pp. 1-8.
Izadi, Shahram et al., "KinectFusion: Real-time 3D Reconstruction and Interaction Using a Moving Depth Camera", Microsoft Research Cambridge, UK, Oct. 16-19, 2011, Santa Barbara, CA, 10pp.
Zhou, Qian-Yi, "Color Map Optimization for 3D Reconstruction with Consumer Depth Cameras", Stanford University Adobe Research, 10 pp, Oct. 29, 2017.

(Continued)

*Primary Examiner* — Yingchun He
(74) *Attorney, Agent, or Firm* — Kilpatrick Townsend & Stockton LLP

(57) ABSTRACT

The disclosure describes systems and methods of selecting colors to points in a digital three-dimensional (3D) model representing a scanned object, based on points and color images associated with the 3D model. Certain embodiments involve selecting from the images a patch for each point in the 3D model, and determining a quality of the patches. The selected patches are analyzed to determine an overall score, representing aggregated quality of the patches and an aggregated smoothness indicating variation between patches selected for neighboring points. In some examples, multiple sets of selected patches are analyzed and scored, and the scores are compared to determine a representative patch set that optimizes the quality and the smoothness. Colors are assigned to the points of the digital model based on the representative set of patches.

20 Claims, 8 Drawing Sheets

(56) References Cited

OTHER PUBLICATIONS

Cho, Sunghyun, "Video Deblurring for Hand-held Cameras Using Patch-based Synthesis", ACM Transactions on Graphics, vol. 31, issue 4, Jul. 2012, 9pp.

Sunkavalli, Kalyan, "Video Snapshots: Creating High-Quality Images from Video Clips", IEEE Transactions on Visualization and Computer Graphics, 15pp.

* cited by examiner

TEXTURING A THREE-DIMENSIONAL SCANNED MODEL WITH LOCALIZED PATCH COLORS

TECHNICAL FIELD

This disclosure relates generally to the field of image processing, and more specifically relates to generating realistic three-dimensional models (e.g., generating models with fewer artifacts or other defects) by analyzing localized patches of pixels and improving color selection for three-dimensional digital models based on the local patch analysis.

BACKGROUND

Camera and scanning technology allows a user to scan a three-dimensional (3D) object and to create a digital 3D model of the scanned object. Handheld scanning technology may allow a user to generate a digital 3D model by moving the scanning device around a target object by, for example, walking in a circle around the object. The digital model may be generated and displayed to the user. In some cases, the digital model includes color or simulated texture, such as by applying a pattern of color to the model.

The quality of such 3D models is partially dependent on the reproduction of small-scale details on the target object. Although reproduction of such minute details is limited by the resolution of the scanning equipment, high-quality color or textures can be simulated on a scanned model. For example, textures can be simulated by applying a pattern of color to a 3D model. Such colors can improve the perceived "realism" of the displayed model, thereby improving the aesthetic qualities of the model.

To create a 3D model, current scanning technologies use depth sensors, such as laser range finders or biopic camera arrangements. Color is added to the model by reconstructing the color of the scanned object. For example, a red-green-blue (RGB) camera or a high-resolution color camera is used with a depth sensor when capturing images used to generate a 3D model. The color images are correlated to the depth images by estimating a transformation matrix between the color camera and the depth camera. Thus, each point in the digital model is correlated with one or more color images, and a color for the point can be determined based on the correlated color images.

Despite recent advances in handheld scanning technology, an effective resolution of handheld scanners is negatively impacted by factors such as device constraints (e.g., size or weight), natural shaking motions of the user holding the equipment, and fluctuations in light and camera position as a user moves the scanner around the object. Furthermore, a user may move the scanning device too quickly, which causes blur in the resulting color images. These factors may result in wide variations in the quality of the color images that are correlated with a given point in the 3D model. These variations in quality complicate the determination of a "correct" color for the given point.

One existing approach to determine the color for a point is to compute an average color from the images (or a subset of the images) in which the point is visible. But the effectiveness of this solution may be limited by wide variations in quality for the color images that result from the use of handheld scanners. For example, some color images may have a poor quality, such as blurriness, low focus, low light, or other indications of poor image quality. Therefore, averaging low-quality images with higher-quality images may result in an incorrect color selection for one or more points, reducing the color fidelity for the scanned 3D model.

Another existing approach is to select a "best quality" image to provide the colors for multiple points. However, an image may have inconsistencies in the quality of different image patches. For example, a patch in one area of an image could have a poor quality, while a patch in another area of an image could have a high quality. Selecting this image as a "best quality" image could result in color selection based on the patches in the poor quality area. Thus, attempts to select a "best quality" image can result in incorrect color selection for some of the points, and can result in poor quality color for the scanned 3D model.

In addition, existing approaches may not account for the number of images used to provide the colors for multiple points. Assigning colors to a model from multiple images may cause seams, or visible edges, to be displayed between points in the model. A 3D model that has colors assigned from a large number of different images can have a large number of a seams between points, creating a "jagged" appearance when the model is displayed to a user. Thus, attempts to assign colors that do not address the number of images used can result in low-quality models with a high number of seams.

Thus, existing solutions may provide low-quality 3D models for reasons such as (but not limited to) those described above.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
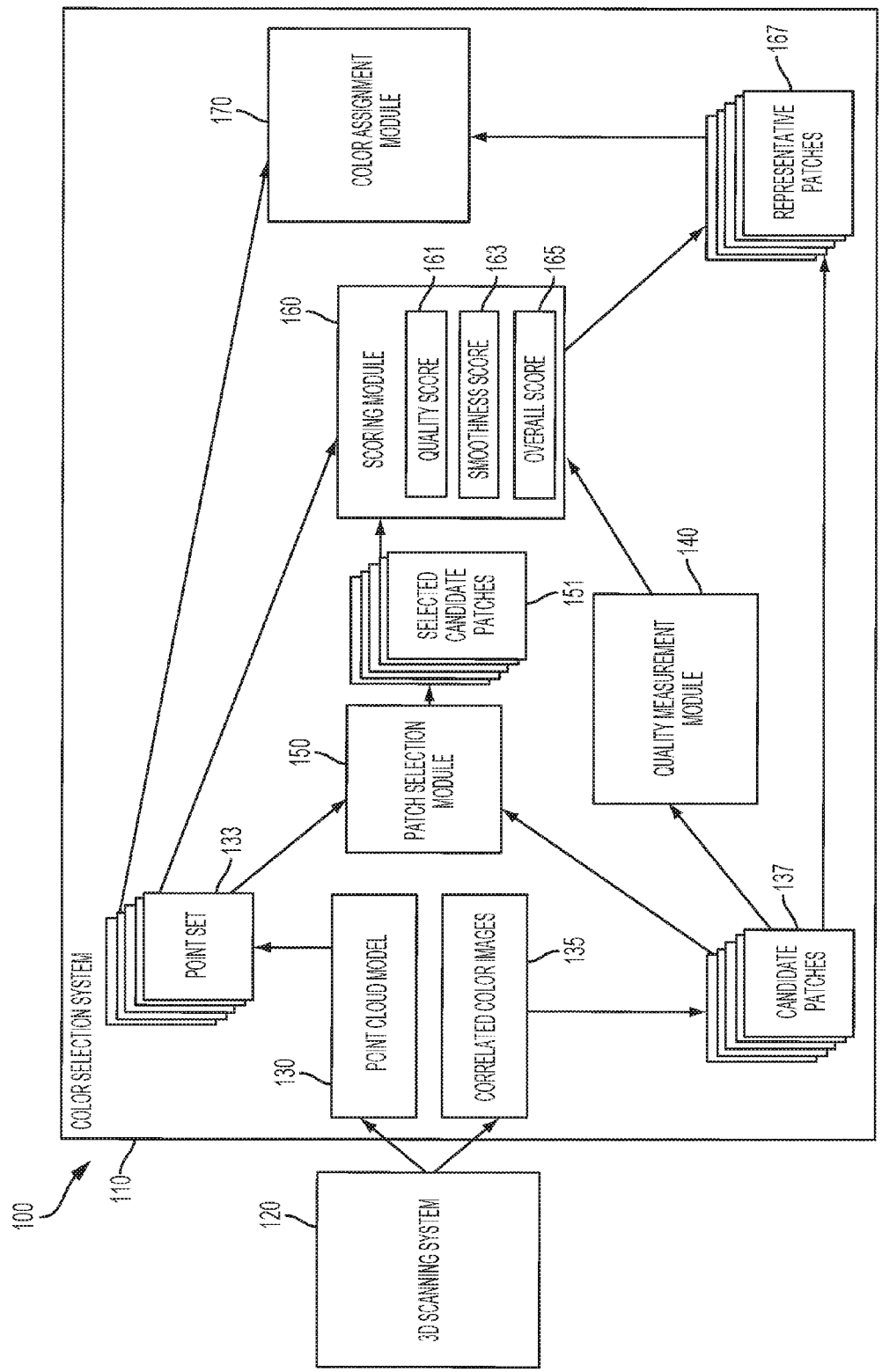
FIG. 1 is a block diagram depicting an example of a color selection system for selecting colors for points in a three-dimensional (3D) model, according to certain embodiments.

Certain embodiments of the present disclosure include systems and methods for assigning colors to points included in a three-dimensional (3D) model. As explained above, conventional solutions for assigning color information to 3D models may result in less realistic or otherwise sub-optimal models when the models rendered, printed, or otherwise displayed to a user. For example, existing systems that assign colors based on a naïve selection of images, or on a "best image" image selection that does not account for regions of poor quality, can result in poor color assignment for the points in the 3D model.

Certain embodiments described herein can provide more realistic 3D models by more accurately selecting color information (e.g., red-blue-green information, grayscale color information, etc.) for the model. In these embodiments, color images are correlated with a set of points from a digital 3D model, and image patches are selected from the received color images. A quality measurement (such as blurriness) is determined for the image patches, and colors are assigned based in part on the quality measurement for the selected patches. Contrasted with existing efforts to assign colors based on a naïve or a "best image" selection of images, the described embodiments provide improved color assignment based on selected patches within images. These improvements result in improved color assignment for points in a 3D model. Improving the color assignment for a 3D model can make the 3D model appear more realistic when rendered or printed. The described embodiments can be implemented to improve the color assignment of a 3D model that already has assigned colors, or to provide superior color assignment for a 3D model that does not yet have assigned colors.

In some embodiments, a point cloud 3D model and a group of color images are received from a 3D scanning device or other suitable device. For example, the color images can include images captured by the scanner during the scanning process, or pictures taken by a separate camera. The group of color images can be correlated with the 3D model. For example, some of the color images, depicting the left side of a scanned object, can be associated with points that represent the surface of the scanned object's left side. In additional or alternative embodiments, patches extracted from the color images can be correlated with the 3D model. For example, some of the extracted patches, depicting a small area of the scanned object, can be associated with points that represent the small area of the object's surface.

In some embodiments, a set of points is extracted from the model, and multiple candidate patches are extracted from the color images. Each candidate patch includes at least one set of pixels that are correlated with a respective point. A patch quality measurement (e.g., a blurriness measurement, a noise measurement) is determined for each of the candidate patches. A particular candidate patch is selected for each point. A quality score and a smoothness score is assigned to the point. The quality score is based on the quality measurement determined for the candidate patch selected for the point. The smoothness score indicates whether a neighboring point has a selected candidate patch that is from the same image as the point's selected candidate patch. An overall score is determined based on the quality and smoothness scores for all points in the set.

Based on this overall score, a set of representative patches is selected from the candidate patches for the set of points. A color is assigned to each point in the set of extracted points from the 3D model. The colors are assigned using color information from the set of representative patches. An updated 3D model can be rendered based on the extracted points and the assigned color information.

In additional or alternative embodiments, each point in the set of points is associated with multiple candidate patches. In such embodiments, a quality score and a smoothness score can be assigned to the point based on any of the multiple candidate patches. Different quality scores and smoothness scores can be assigned based on different candidate patches. For example, a point that has four associated candidate patches can have four quality scores assigned to it, and each quality score can be assigned based on one of the candidates.

In additional or alternative embodiments, selection of the different candidate patches is repeated for many possible sets of selected candidate patches, and a different particular overall score is determined for each of the candidate sets. The overall score (as described above) and the one or more different overall scores are compared to determine an optimal overall score. In additional or alternative embodiments, selection of the representative set of patches (as described above) is based on the optimal overall score.

Certain embodiments described herein can also minimize the number of images, or image patches, from which colors are assigned. Minimizing the number of image patches from which colors are assigned can increase the visual quality for a 3D model displayed to a user (e.g., by reducing the number of seams in the 3D model). For example, colors may be assigned based on a minimal number of images, a minimal number of patches within images, or both. These embodiments can provide improved smoothness between points in the 3D model as compared to convention systems. For example, these embodiments may reduce the perceived "jaggedness" between points, thereby increasing the realism for a rendered or printed 3D model. In additional or alternative embodiments, systems and methods are described to reach an optimal selection of patches that both have sufficient quality and are minimal in number.

As used herein, the term "digital 3D model" refers to a digital representation of a 3D object that has been scanned using a 3D scanning system, such as a handheld 3D scanner. In some embodiments, a digital 3D model includes a collection of points that have been collected by the scanning system. In some embodiments, the 3D model includes a collection of color images that are correlated with one or more points in the model.

One example of a digital 3D model is a point cloud, such as a collection of points represented in a virtual space (i.e., "cloud"). A point cloud includes a collection of digital coordinates with locations in a digital representation of a 3D space. The collection of digital coordinates, when viewed on a display, simulates the scanned object within the digital representation of space.

Another example of a digital 3D model is a mesh, such as a collection of vertices and edges represented in virtual space. An example mesh includes a collection of vertices connected to nearby vertices, such that the connections form edges. The collection of vertices and edges, when viewed on a display, could simulate the scanned object.

As used herein, the term "point" refers to a digital representation of a local area of a surface of a scanned 3D object. A digital coordinate from a point cloud, as described above, may be called a point. A vertex in a mesh 3D model, as described above, may also be called a point. In some embodiments, a point represents information about the local surface area of the 3D object, such as information representing a distance measurement from the scanning system or a color of the local surface area. In additional or alternative embodiments, a point from a digital 3D model includes or is associated with information about relationships with other points in the digital model or a distance measurement from an origin of an arbitrary coordinate system for the digital model. In additional or alternative embodiments, a point includes or is associated with information about a scanning system used to produce the digital model, such as information about camera settings during a scan or an accelerometer reading during a scan.

As used herein, the term "neighboring point" refers to one or more additional points located nearby a particular point. In some embodiments, for a particular point, a collection of neighboring points is determined by a distance from the particular point, such as all points located within a certain radius of the particular point. In additional or alternative embodiments, for a particular point, a collection of neighboring points is determined by a relationship with the particular point, such as all points connected by edges to the particular point. In additional or alternative embodiments, a collection of neighboring points is limited to points that represent locations on a same surface of the scanned object. For example, for a particular point representing an area on an upper surface of a very thin sheet of plastic, the neighboring points can be limited to points representing areas on the same upper surface, excluding points representing the lower surface of the thin sheet.

As used herein, the term "color image" refers to a digital image including information representing a color or a simulated color of a target object. As used herein, the term "color" includes any suitable representation of the target object's color, including saturated colors, greyscale, black-and-white, sepia tones, etc.

As used herein, the term "patch" refers to a localized region of a digital image. In some embodiments, a patch is a set of pixels selected from a two-dimensional color image including pixels. In some embodiments, a patch is a set of adjacent pixels forming a continuous region within an image. A patch may include a single pixel. A patch may include all pixels in an image. In additional or alternative embodiments, the patch, or the color image, or both, is correlated with a point in a digital 3D model. A patch may overlap with another patch within an image. A patch may be correlated with multiple point. A point may be correlated with multiple patches, including patches from multiple images.

As used herein, the term "quality measurement" refers to a measurement of a perceivable visual characteristic of an image, a patch, or both. The measured visual characteristic may be blurriness, noise, light saturation, or any suitable visual characteristic of the image or patch. In some embodiments, the quality measurement measures a difference in the perceivable visual characteristic of a first patch as compared to the visual characteristic of a second patch.

As used herein, the term "smoothness" refers to variation between two or more patches selected for respective points. In some embodiments, smoothness for a particular point is determined by comparing the patch selected for the particular point to the patches selected for the neighboring points of the particular point.

As used herein, the term "score" refers to a numeric value of a particular characteristic, such as quality or smoothness. In some embodiments, a characteristic score for a point is based at least in part on a numeric value of that characteristic for the point. In additional or alternative embodiments, a characteristic score for a point is based at least in part on a transformation of the numeric value, such as a weighting factor or normalization of the score. In some embodiments, aggregate scores are determined for multiple points having scores.

Referring now to the drawings, FIG. 1 is a block diagram depicting an example of a computing environment 100 in which a color selection system 110 assigns colors to points in a digital 3D model of a scanned object. The depicted computing environment 100 includes a 3D scanning system 120 and the color selection system 110. However, other configurations may be implemented using additional or alternative components.

The 3D scanning system 120 is used to scan a physical target object (not depicted). In some embodiments, the 3D scanning system 120 collects depth information regarding the target object. In additional or alternative embodiments, the scanning system 120 collects color information regarding the target object and relates the collected color information with the collected depth information. In certain embodiments, color information is collected separately, and the color and depth information are related using any appropriate method.

Based on the collected color and depth information, the 3D scanning system 120 provides a point cloud model 130 or other digital 3D model to the color selection system 110. The 3D scanning system 120 also provides related color information, such as color images 135 that are correlated with the point cloud model 130, to the color selection system 110. In some embodiments, the color selection system 110 extracts a set of points 133 from the digital model. For example, an image, from color images 135, that shows a certain area of a scanned object can be correlated with the extracted points that represent that area of the object's surface.

In additional or alternative embodiments, the color selection system 110 extracts candidate patches 137 from the related color information. In certain embodiments, the candidate image patches 137 are localized image patches extracted from the correlated color images 135. Each candidate patch includes at least one set of pixels that is correlated with a respective point from the extracted set of points 133. For example, a candidate patch and an included set of pixels depicting a local area of the scanned object's surface can be correlated with an extracted point that represents that area. A particular extracted point can be correlated with multiple sets of pixels in multiple patches. For example, one or more points may have multiple correlated candidate patches in the group of candidate patches 137.

In some embodiments, a quality measurement module 140 determines a quality measurement for each patch in the candidate patches 137. The determined quality measurement may be associated with the particular patch for which the quality measurement was calculated. In certain embodiments, the determined quality measurements quantify a visual characteristic of the respective candidate patches 137, such as blurriness, noise, or saturation. In additional or alternative embodiments, the determined quality measurements quantify a perceivable difference in a visual characteristic of the respective patches, such as a difference in blurriness, noise, or saturation.

In the example depicted in FIG. 1, a patch selection module 150 selects, for each point in the set of points 133, a particular candidate patch from the candidate patches 137. The particular candidate patch can include a set of pixels that is correlated with the point. In some embodiments, the particular patch has an associated quality measurement that is determined by quality measurement module 140. In the depicted example, the set of selected candidate patches 151 includes the particular patches selected for the set of points 133.

In some embodiments, a scoring module 160 assigns one or more scores to each point in the set of points 133, the scores based on the candidate patch selected for the point. For example, the scoring module 160 determines a quality score 161 for each point. In some embodiments, the quality score 161 can be based on the quality measurement associated with the candidate patch. In additional or alternative embodiments, the quality score 161 can be based on a transformation of the quality measurement, such as a normalized measurement. The scoring module 160 assigns each determined quality score 161 to each respective point in the set of points 133. For example, a point having a candidate patch with a measurement indicating good quality can be assigned a quality score indicating good quality.

In additional or alternative embodiments, the scoring module 160 determines a smoothness score 163 for each point. In some embodiments, the smoothness score 163 for a particular point is determined by comparing the particular candidate patch selected for the point to the candidate patches selected for the neighboring points of the point. For example, if a point has a candidate patch that is extracted from the same image as the candidate patches for every neighboring point, the point can be assigned a smoothness score indicating good smoothness. In additional or alternative embodiments, the smoothness score 163 can be based on a transformation of the patch comparison, such as a transformation based on a weighting factor.

In additional or alternative embodiments, the scoring module 160 determines an overall score 165 for the set of points 133 and the selected candidate patches 151 selected by patch selection module 150. In some embodiments, the overall score 165 can be based on a combination of the quality scores and the smoothness scores determined for the set of points 133. In additional or alternative embodiments, the overall score 165 can be based on a transformation of the combination of the quality and smoothness scores, such as a transformation based one or more weighting factors. The determined overall score 165 can be associated with the set of points 133, the set of selected candidate patches 151, or both.

As described above, one or more points in the set of points 133 may have multiple correlated candidate patches in the group of candidate patches 137. In additional or alternative embodiments, for each point that has multiple correlated patches, the patch selection module 150 selects a different candidate patch that is included in a different set of selected candidates 151. In these embodiments, the scoring module 160 assigns additional quality and smoothness scores to each point based on the different selected candidate patches 151. The scoring module 160 determines an additional overall score 165 for the different selected candidate patches 151. In additional or alternative embodiments, the color selection system 110 compares the multiple overall scores to determine an optimal overall score. The optimal overall score can indicate an optimal combination of the quality and smoothness scores for the multiple sets of selected candidate patches 151.

In the example depicted in FIG. 1, the color selection system 110 selects a set of representative patches 167. In some embodiments, the representative set 167 is selected based on the determined overall score 165, and patches from the associated selected candidate patches 151 are selected for the set of representative patches 167. In additional or alternative embodiments, if multiple overall scores 165 are determined for multiple sets of selected candidates 151 as described above, then selection of the representative set 167 is based on the optimal overall score. In such embodiments, the set of representative patches 167 includes patches that are selected from the set of selected candidate patches 151 associated with the optimal overall score.

In some embodiments, a color assignment module 170 assigns a color to each extracted point in the set of points 133. In additional or alternative embodiments, the assignment of colors is based on the set of representative patches 167. For example, a color for a point can be assigned based on a color of the pixels correlated with the point in a representative patch associated with the point. In additional or alternative embodiments, the color can be assigned based on an average color of the correlated pixels. In additional or alternative embodiments, the color can be assigned based on a transformation of the color of the correlated pixels. An example of a transformation is converting a red-green-blue (RGB) color to a cyan-magenta-yellow-key (CMYK) color for the point.

Although not depicted, the computing environment 100 may also include one or more remote systems capable of receiving, storing, and retrieving any of the elements described in relation to FIG. 1. For example, a remote system, such as remote system 915 depicted in FIG. 17, could store the correlated color images 135 and provide the candidate patches 137 to the color selection system 110.

Figure 3:
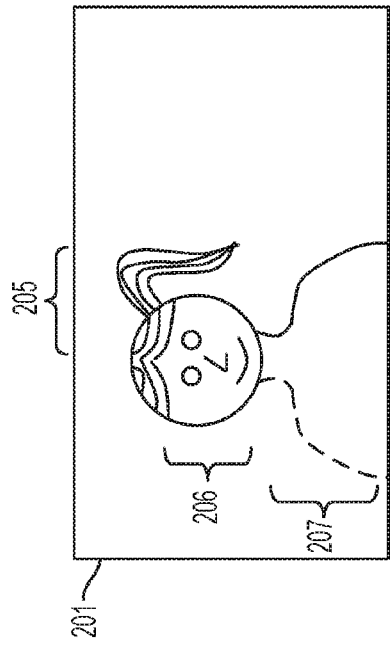
FIG. 3 is a diagram depicting another example image of variable quality that is collected by scanning a target object, according to certain embodiments.
Figure 5:
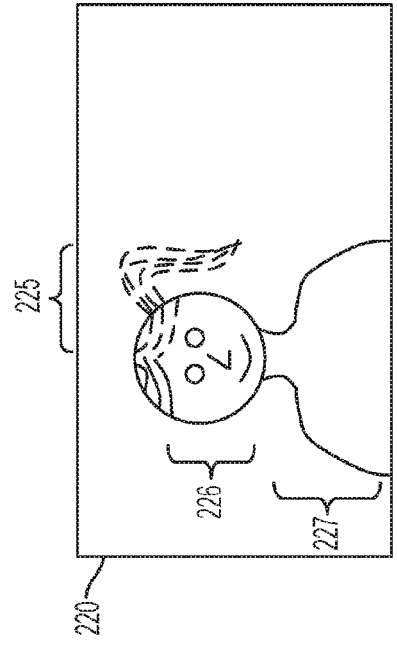
FIG. 5 is a diagram depicting another example image of variable quality that is collected by scanning a target object, according to certain embodiments.
Figure 2:
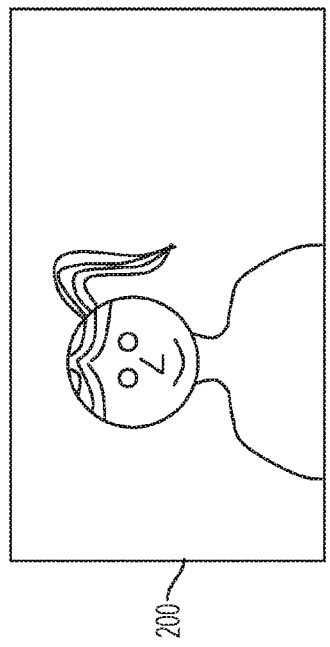
FIG. 2 is a diagram depicting an example image of variable quality that is collected by scanning a target object, according to certain embodiments.
Figure 4:
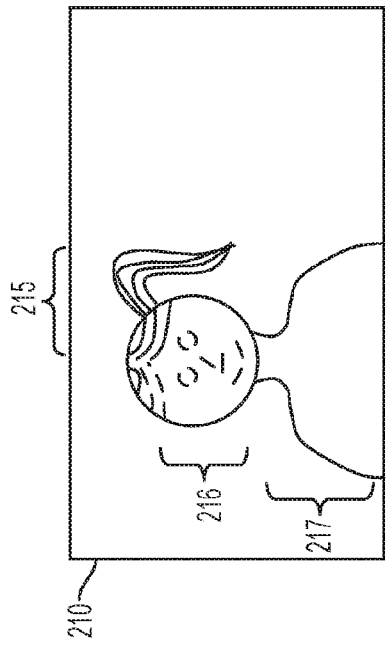
FIG. 4 is a diagram depicting another example image of variable quality that is collected by scanning a target object, according to certain embodiments.

In some embodiments, depth information (e.g., the point cloud model 130) and color information (e.g., the correlated color images 135) are collected by the 3D scanning system 120 while a user moves the scanning system 120 around the target object. In such situations, collected color information may vary highly in quality, such as indicated in the example correlated images depicted in FIGS. 2, 3, 4, and 5. For example, images can be collected while scanning a target object, as shown in FIGS. 2-5. If the scanning system 120 is moved carefully around the target, a collected image can have good quality in all image regions related to all surfaces of the target object, such as image 200 in FIG. 2. However, another image 201, such as shown in FIG. 3, can have good quality in certain regions, such as regions 205 and 206, while other regions have lower quality, such as region 207. This can result in differing quality image regions related to different surfaces of the target. In another image 210, such as shown in FIG. 4, other regions can have good quality in certain regions, such as regions 215 and 217, while other regions have lower quality, such as region 216. In another image 220, such as shown in FIG. 5, still other regions can have good quality in certain regions, such as regions 226 and 227, while other regions have lower quality, such as region 225. Although FIGS. 2-5 depict a same view (facing forward) of the target, slight variations in position and angle during scanning result in slight differences in the content of such images, such as while moving the scanner around the target.

Figure 6:
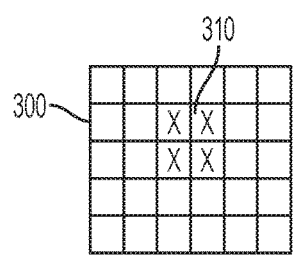
FIG. 6 is a diagram depicting an example of an image correlated with a particular point in a 3D model, according to certain embodiments.
Figure 7:
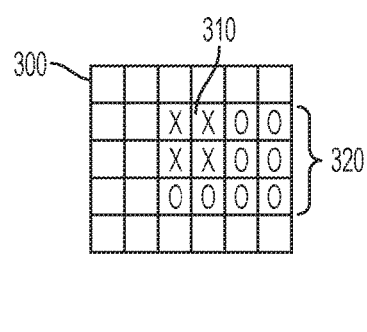
FIG. 7 is a diagram depicting an example of an image and a patch correlated with a particular point in a 3D model, according to certain embodiments.
Figure 8:
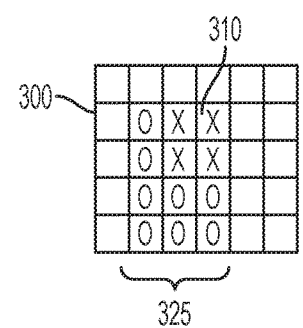
FIG. 8 is a diagram depicting an example of an image and a patch correlated with a particular point in a 3D model, according to certain embodiments.

In some embodiments, the collected depth information is represented in a digital 3D model, from which points (e.g., the point set 133) are extracted. In such embodiments, extracted points are correlated with a color image, and local image patches are extracted from the color image. The patches each include at least one set of pixels that is correlated with a respective point. For example, FIGS. 6-8 depict an example image 300 including pixels. The image 300 is correlated with an example particular point. The particular point is a digital representation of depth information, and is not visible in the correlated images. Image 300 contains a set of pixels 310 (represented by Xs) that is also correlated with the point. FIG. 7 depicts a patch 320 that includes the pixel set 310. FIG. 8 depicts another patch 325 that includes the pixel set 310. The patches 320 and 325 could each be a candidate patch (e.g., from the candidate patches 137) for the point. An image, such as image 300, can contain sets of pixels (including sets that overlap wholly or partly with another pixel set, such as pixel set 310) that are correlated with other extracted points, but these are not shown for the sake of clarity.

Figure 9:
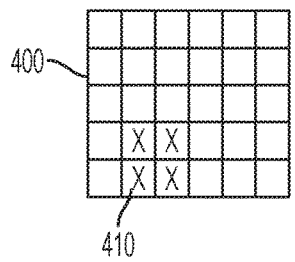
FIG. 9 is a diagram depicting an example of an image correlated with a particular point in a 3D model, according to certain embodiments.
Figure 10:
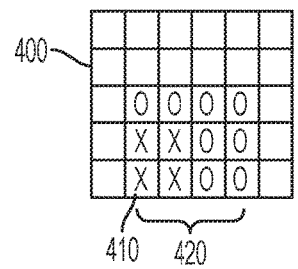
FIG. 10 is a diagram depicting an example of an image and a patch correlated with a particular point in a 3D model, according to certain embodiments.
Figure 11:
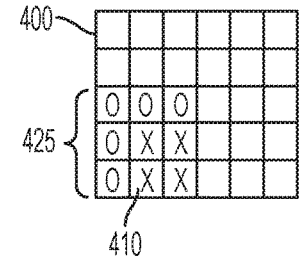
FIG. 11 is a diagram depicting an example of an image and a patch correlated with a particular point in a 3D model, according to certain embodiments.

In additional or alternative embodiments, extracted points are correlated with multiple color images. Local image patches, including at least one set of pixels correlated with a respective point, are extracted from the multiple color images. For example, FIGS. 9-10 depict an example image 400 including pixels, the image 400 being correlated with the same particular point described in regards to FIGS. 6-8. Image 400 contains a set of pixels 410 (represented by Xs) that is also correlated with the point. FIG. 10 depicts a patch 420 that includes the pixel set 410. FIG. 11 depicts another patch 425 that includes the pixel set 410. The patches 420 and 425 could each be a candidate patch (e.g., from the candidate patches 137) for the point.

In FIGS. 6-8 and 9-11, the exemplary particular point is correlated with at least four candidate patches 320, 325, 420, and 425. Each of the candidate patches 320, 325, 420, and 425 includes either the set of pixels 310 or 410 that are correlated with the point. The patch selection module 150 selects, for the point, each of the candidate patches 320, 325, 420, or 425, creating four different sets of selected patches (e.g., four examples of selected set 151). For each of these selected sets, scoring module 160 assigns a quality and smoothness score to the point. The scoring module 160 determines an overall score associated with the particular set. The color selection system 110 compares the four overall scores associated with the selected sets. The color selection system 110 chooses a set of representative patches (e.g., representative set 167) based on the compared overall scores.

Overall Score

In some embodiments, an overall score for a set of selected patches (such as selected patches 151) is based on a quality score and a smoothness score assigned to each point correlated with a selected patch. In additional or alternative embodiments, the overall score can be determined by solving a minimization function. One example of such a minimization function is:

$$E = \sum_p D(p, l(p)) + w_s \sum_p \sum_{q \in N_p} S(p, q, l(p), l(q)) \quad \text{Eq. 1}$$

Here, E refers to the determined overall score for a set of selected patches, where l(p) represents a patch selected for a point p. In the example Eq. 1, the overall score E is based on the quality scores calculated in the term $\Sigma_p D(p,l(p))$, and also based on the smoothness scores calculated in the term $\Sigma_p \Sigma_{q \in N_p} S(p,q,l(p),l(q))$.

Considering the aggregated quality score $\Sigma_p D(p,l(p))$, a quality score $D(p,l(p))$ is calculated for each point p based on the selected patch l(p) for that point. An aggregated quality score is based on the quality scores for all the points in the set of extracted points. In Eq. 1, the aggregated quality score is determined by summing the calculated quality score $D(p,l(p))$ over all points p.

Considering the aggregated smoothness score $\Sigma_p \Sigma_{q \in N_p} S(p,q,l(p),l(q))$, a smoothness term $S(p,q,l(p),l(q))$ is calculated for each point p based on the selected patch l(p) for that point p and on a selected patch l(q) for a point q that is a neighbor of point p. In this example, for each point p in the set of points, a smoothness score $\Sigma_{q \in N_p} S(p,q,l(p),l(q))$ is calculated for p by summing the values calculated for each point q in the set of p's neighbors. An aggregated smoothness score is based on the smoothness scores for all the points in the set of extracted points. In Eq. 1, the aggregated smoothness score is determined by summing the calculated smoothness score $\Sigma_{q \in N_p} S(p,q,l(p),l(q))$ over all points p.

In additional or alternative embodiments, the aggregate quality score, the aggregate smoothness score, or both can be weighted using a weighting factor. The mathematical terms in Eq. 1 may conflict with each other. For example, a set of selected patches that results in a minimum aggregate quality score may not result in a minimum aggregate smoothness score. In additional or alternative embodiments, a weighting factor may be applied to one or more particular terms to increase or decrease the mathematical importance of the particular term. For example, a weighting factor may be applied to the aggregate smoothness score if it is desirable that the overall score is determined primarily based on the quality of the selected patches. In Eq. 1, the aggregate smoothness score has a weighting factor $w_s$ applied. A weighting factor can modify the value of the aggregate score to which it is applied, and can be chosen to increase or decrease the modified value.

In some embodiments, a minimization function used to determine the overall score can be solved multiple times for multiple sets of selected patches. For example, Eq. 1 can be solved multiple times for multiple patches l(p) selected for a point p, or for multiple patches l(q) selected for p's neighboring points q. In such embodiments, the resulting overall scores can be compared to determine a particular set of selected patches that results in an optimal combination of quality for each patch and smoothness between the patches. In the minimization function Eq. 1, the overall score E having the lowest value can indicate an optimal set of selected patches l(p).

Quality Score

Figure 12:
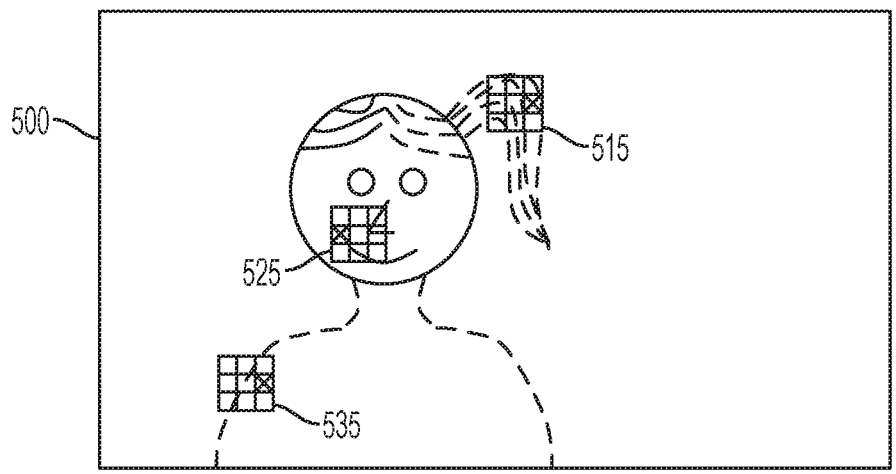
FIG. 12 is a diagram depicting examples of patches extracted from images, according to certain embodiments.
Figure 13:
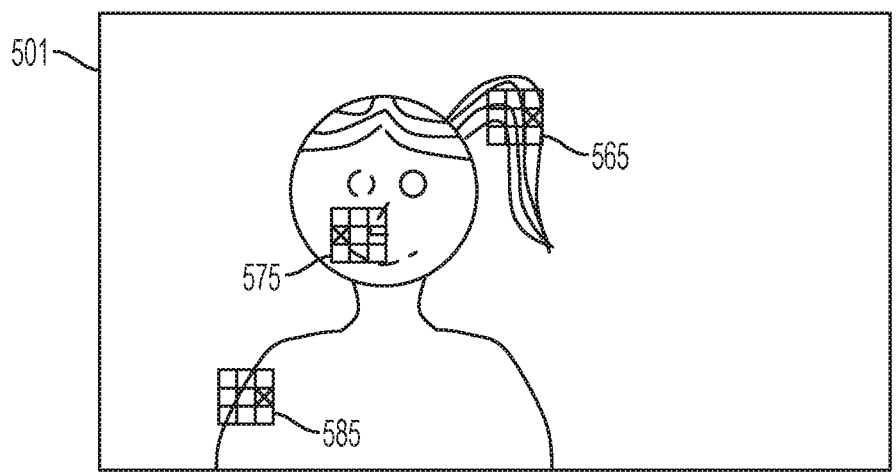
FIG. 13 is a diagram depicting examples of patches extracted from images, according to certain embodiments.

In some embodiments, patches extracted from color images (e.g., candidate patches 137 extracted from, e.g., correlated color images 135) have a patch quality measurement determined for each patch. In additional or alternative embodiments, the determined patch quality measurement for a particular patch extracted from an image may be different from the quality measurements determined for other patches extracted from the same image. For example, FIGS. 12-13 are diagrams depicting example images 500 and 501. In FIG. 12, three patches 515, 525, and 535 are extracted from image 500. In FIG. 13, three patches 565, 575, and 585 are extracted from image 501.

In image 500, the depicted content (the face, torso, and ponytail of an example scanned target) is indicated to have higher quality regions (such as the target's face) and lower quality regions (such as the target's ponytail and torso). Accordingly, the patch 525 can have a determined quality measurement that is different from the quality measurements for the patches 515 and 535.

In some embodiments, a quality measurement for a patch is based on any suitable indicator of a visual characteristic of the patch, such as the visual characteristic of blurriness, noise, light saturation, or any other suitable indicator of patch quality. In additional or alternative embodiments, the quality measurement can have a numeric value between 0 and 1, or be normalized to have a numeric value between 0 and 1, such that 1 indicates a patch with high quality (e.g., a high-quality image region with good focus), while 0 indicates a patch with very low quality (e.g., an image region taken from a moving camera).

One example of a blurriness measurement for a patch is a determined difference between the patch and a Gaussian-smoothed modification of the patch. For example, a patch is extracted from an image region having relatively high quality (such as patch 525). The patch can be modified by performing a Gaussian smoothing operation. A quality measurement for the patch can be determined by comparing the original patch to the modified patch. In this example, a comparison of the original patch (extracted from a high-quality image region) to the modified patch (modified by the smoothing operation) could indicate a large difference between the original and modified patches, and a quality measurement based on this comparison could quantify that the extracted patch has a relatively high quality. In another example, comparison of another patch extracted from a region having relatively low quality (such as patch 515) to a Gaussian-smoothed modification of the patch could indicate a small difference between the original and modified patches. A quality measurement based on this comparison could quantify that the extracted patch has a relatively low quality.

In additional or alternative embodiments, the quality measurements for patches corresponding to similar surfaces of the target object (such as patches 515 and 565) are normalized. For example, the measurements can be normalized within a range of 0 to 1 (inclusive). In additional or alternative embodiments, a quality score for a point correlated with one or more of the patches is determined based on the normalized quality measurements.

As described above regarding Eq. 1, a quality score $D(p,l(p))$ is calculated for each point p based on the selected patch $l(p)$ for that point. In some embodiments, quality score $D(p,l(p))$ is based on a quality measurement for patch $l(p)$, such as the quality measurement for blurriness. One example of a function to determine $D(p,l(p))$ is:

$$D(p,l(p))=1.0-e^{(5.0(b(l(p))-1.0))} \qquad \text{Eq. 2}$$

Here, $b(l(p))$ refers to the determined blurriness measurement for the patch $l(p)$, normalized in the range of 0 to 1 (inclusive). In some embodiments, a measurement of 1 indicates a patch with high quality, while a measurement of 0 indicates a patch with very low quality.

The determined $D(p,l(p))$ could be used in regards to Eq. 1 to determine an overall score for the relevant set of patches. As described above, Eq. 1 is a minimization function. Regarding Eq. 2, a $b(l(p))$ of 1 (for a high-quality patch) would result in a quality score $D(p,l(p))$ of 0, while a $b(l(p))$ of 0 (for a low-quality patch) would result in a quality score $D(p,l(p))$ of approximately 1. Accordingly, selecting higher-quality patches $l(p)$ with a $b(l(p))$ close to 1 would result in a lower value for the aggregate quality score $\Sigma_p D(p,l(p))$. In the minimization function Eq. 1, an overall score E that is based on an aggregate quality score having a lower value could also have a lower value.

Smoothness Score

Figure 14:
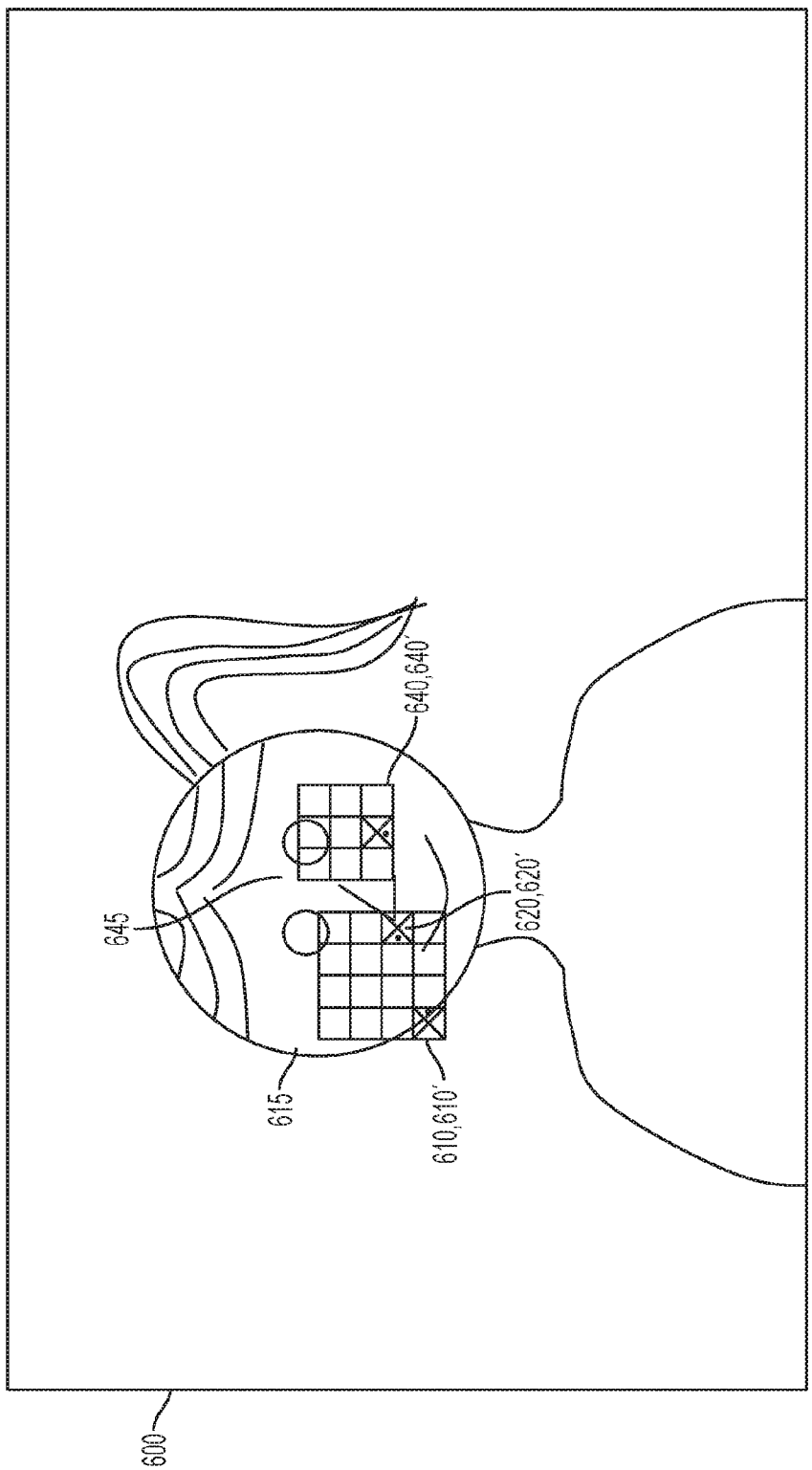
FIG. 14 is a diagram depicting an example of patches that are extracted from an image, and that include pixels associated with points, according to certain embodiments.

In some embodiments, a smoothness score for a point is determined by comparing the patch selected for the point to the patches selected for the neighboring points of the point. In additional or alternative embodiments, the smoothness score is determined based on the selected patch for the point having been extracted from a same image as the patches selected for neighboring points. For example, FIG. 14 is a diagram depicting example image 600, and two patches 615 and 645 that are extracted from image 600. Patch 615 includes pixels 610 and 620. Patch 645 includes pixel 640. Pixels 610, 620, and 640 are each correlated with a respective example point 610', 620', and 640'. The example points 610', 620', and 640' are digital representations of depth information and would not be visible in the image 600, but are diagrammatically shown in FIG. 14 for clarity.

In FIG. 14, the point 610' has a neighboring point 620'. Both of these points have patch 615 as their selected patch. A smoothness score for the point 610' is calculated based on the determination that point 610' and neighboring point 620' have a selected patch extracted from a same image 600.

In FIG. 14, the point 620' has a neighboring point 640'. Point 620' has selected patch 615, and point 640' has selected patch 645. A smoothness score for the point 620' is calculated based on the determination that point 620' and neighboring point 640' each have selected patches extracted from the same image 600.

As described above regarding Eq. 1, a smoothness score $\Sigma_{q \in N_p} S(p,q,l(p),l(q))$ is calculated for p by summing the values calculated for each point q in the set of p's neighbors. In some embodiments, smoothness term $S(p,q,l(p),l(q))$ is calculated for each point p and each neighboring point q, based on the selected patch $l(p)$ for p and on a selected patch $l(q)$ for q. One example of a function to determine the term $S(p,q,l(p),l(q))$ is:

$$S(p, q, l(p), l(q)) = \begin{cases} 0, & l(p) \text{ and } l(q) \text{ selected from same image} \\ 1, & l(p) \text{ and } l(q) \text{ selected from different image} \end{cases} \qquad \text{Eq. 3}$$

Here, $S(p,q,l(p),l(q))$ is assigned a value of 0 if $l(p)$ and $l(q)$ are extracted from a same image, and $S(p,q,l(p),l(q))$ is assigned a value of 1 if $l(p)$ and $l(q)$ are extracted from a different image. For a particular point, the smoothness score $\Sigma_{q \in N_p} S(p,q,l(p),l(q))$ could be calculated by summing the values (e.g., 1's or 0's) of the term $S(p,q,l(p),l(q))$ for each neighbor q.

The determined smoothness score $\Sigma_{q \in N_p} S(p,q,l(p),l(q))$ can be used in regards to Eq. 1 to determine an overall score for the relevant set of patches. As described above, Eq. 1 is a minimization function. Regarding Eq. 3, a point p having many neighbors q with patches selected from the same image as p's patch would result in a lower smoothness score, while a point p having many neighbors q with patches selected from images different from p's patch would result in a higher smoothness score. Accordingly, selecting patches from the same image would result in a lower value for the aggregate smoothness score $\Sigma_p\Sigma_{q \in N_p}S(p,q,l(p),l(q))$. In the minimization function Eq. 1, an overall score E that is based on an aggregate smoothness score having a lower value could also have a lower value.

Uniqueness Score

In additional or alternative embodiments, the overall score is determined based on additional values that are represented in a minimization function. One example of such a minimization function with additional values is:

$$E = \sum_p D(p, l(p)) + w_s \sum_p \sum_{q \in N_p} S(p, q, l(p), l(q)) + w_u \sum_i I(u)U(i) \quad \text{Eq. 4}$$

Here, E refers to the determined overall score for a set of selected patches, where l(p) represents a patch selected for a point p. In the example Eq. 4, the overall score E is based on the aggregate quality and smoothness scores calculated in the terms $\Sigma_p D(p,l(p))$ and $\Sigma_p\Sigma_{q \in N_p}S(p,q,l(p),l(q))$, and is also based on an aggregated uniqueness score calculated in the term $\Sigma_i I(u)U(i)$.

Considering the terms $\Sigma_p D(p,l(p))$ and $\Sigma_p\Sigma_{q \in N_p}S(p,q,l(p),l(q))$, an aggregate quality score and aggregate smoothness score are calculated as described above.

Considering the aggregate uniqueness score $\Sigma_i I(u)U(i)$, a uniqueness score I(i)U(i) is calculated for each image i (e.g., the correlated color images 135). The term I(i) is an indicator function that indicates whether at least one patch from the image i was selected (e.g., in selected candidate patches 151). For example, I(i) can have a value of 1 if at least one patch was selected from image i, and a value of 0 if no patches were selected from image i. The term U(i) is a constant value (e.g., 1.0) that is calculated for each image i. An aggregated uniqueness score is based on the uniqueness scores for all the images in the set of images. In Eq. 4, the aggregated uniqueness score is determined by summing the calculated uniqueness score I(i)U(i) over all images i. Accordingly, selecting patches from a smaller number of images i would result in a lower value for the aggregate uniqueness score. In the minimization function Eq. 4, an overall score E that is based on an aggregate uniqueness score having a lower value could also have a lower value.

In additional or alternative embodiments, the aggregate uniqueness score is weighted using a weighting factor. In the example Eq. 4, the aggregate uniqueness score has a weighting factor $w_u$ applied.

Figure 15:
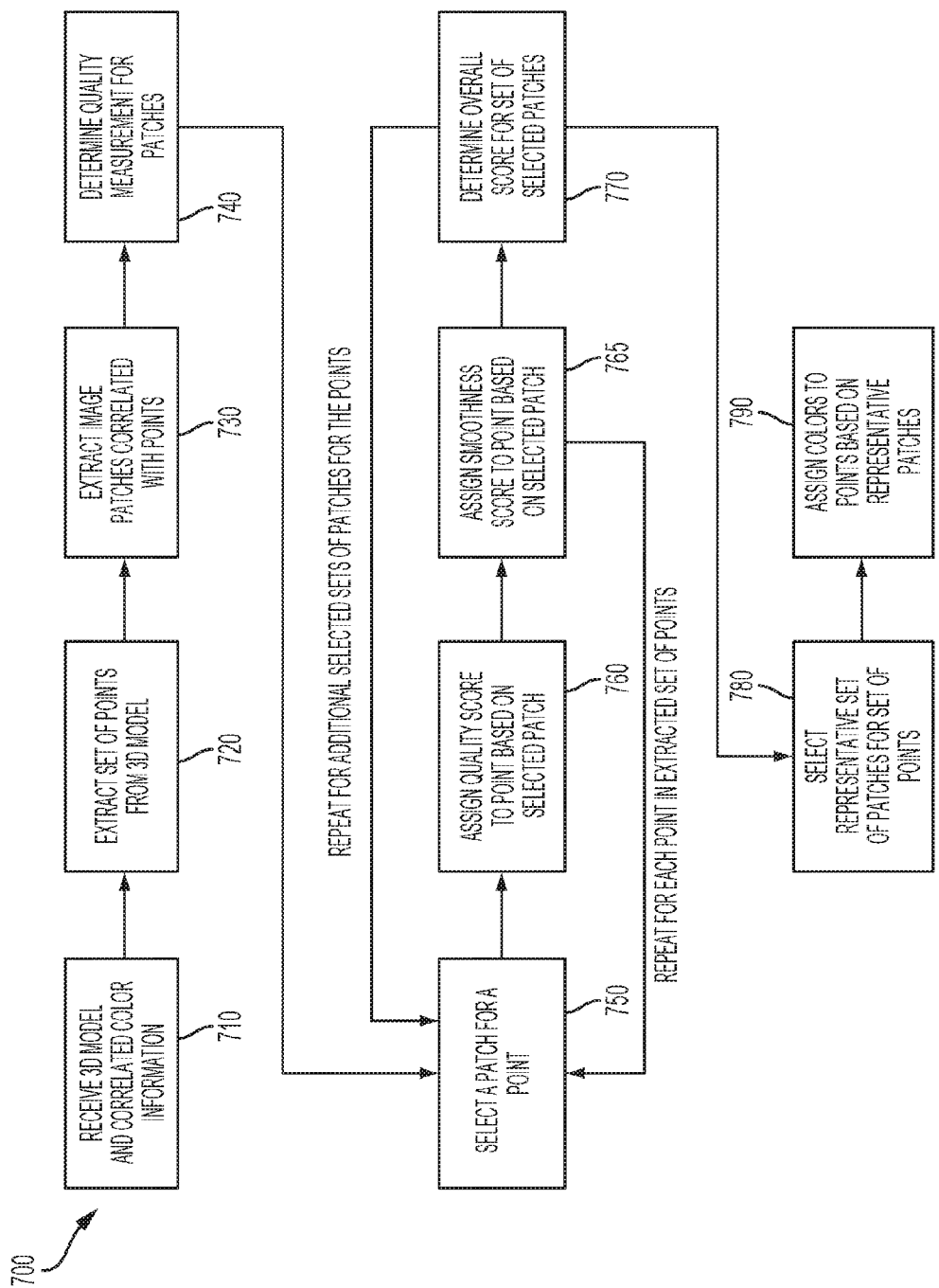
FIG. 15 is a flow chart depicting an example of a process for analyzing a digital 3D model and assigning colors to points within the digital 3D model, according to certain embodiments.

FIG. 15 is a flow chart depicting an example of a process 700 for analyzing a received digital 3D model and color information, and assigning color to points within the digital model. In some embodiments, a color selection system 110 implements operations depicted in FIG. 15 by executing suitable program code. For illustrative purposes, the process 700 is described with reference to the examples depicted in FIGS. 1-14. Other implementations, however, are possible.

At block 710, the process 700 involves receiving a 3D model and correlated color information. As noted above regarding FIG. 1, the color selection system 110 can receive one or more of a point cloud model 130 and a group of correlated images 135. However, other 3D models, such as a mesh, could also be received. The 3D model and color information can be received from a scanning system, such as 3D scanning system 120.

At block 720, the process 700 involves extracting a set of points from the received 3D model. For example, the color selection system 110 can extract a point set 133 from the point cloud model 130.

At block 730, the process 700 involves extracting, from the received color information a set of images patches. For example, the color selection system 110 can extract a set of candidate patches 137 from the correlated color images 135. The extracted image patches are correlated with the extracted set of points.

At block 740, the process 700 involves determining a quality measurement for the extracted patches. As noted above regarding FIG. 1, the quality measurement module 140 can determine the quality measurements for the extracted patches 137. The determined quality measurement quantifies a blurriness of the patch, a noise level of the patch, or any other suitable visual characteristic.

At block 750, the process 700 involves selecting a candidate patch for an extracted point. The selected candidate patch includes pixels correlated with the extracted point. For example, the patch selection module 150 can select, for each point in the point set 133, a candidate patch from the set of candidate patches 137. The selected patches, such as selected candidate patches 151, can be provided to the scoring module 160.

At block 760, the process 700 involves assigning a quality score to an extracted point based on the selected candidate patch. At block 765, the process 700 involves assigning a smoothness score to an extracted point based on the selected candidate patch. For example, the scoring module 160 can determine the quality and smoothness scores 161 and 163 for an extracted point in the point set 133. The assigned quality and smoothness scores are determined based on the determined quality measurements for selected candidate patches. For example, a quality score can be assigned as described regarding Eq. 2.

The process 700 repeats blocks 750-765 for additional extracted points in the set of extracted points. For example, a quality and smoothness score is assigned to each point based on the patch selected for the point.

At block 770, the process 700 involves determining an overall score for the points and the selected patches for the points, based at least on the assigned quality and smoothness scores. As noted above regarding FIG. 1, the scoring module 160 can determine the overall score 165 for the point set 133 and the selected patches 151. For example, the overall score can be determined as described regarding Eq. 1 or Eq. 4.

In some embodiments, the process 700 repeats blocks 750-770 for additional patches selected for one or more of the extracted points. For example, an additional overall score is determined for each set of selected candidate patches that is available for the extracted points.

At block 780, the process 700 involves selecting a representative set of patches for the extracted points, based on the determined overall scores for the one or more sets of selected candidate patches. For example, the color selection system 110 can select the representative set of patches 167 based on the overall score or scores 165 determined by scoring module 160.

At block 790, the process 700 involves assigning a color to each extracted point, based on the representative set of patches. As noted above regarding FIG. 1, the color assignment module 170 can assign the colors for point set 133, based on the representative set of patches 167. For example, a color can be assigned based on an a color of one or more pixels correlated with the point. In additional or alternative embodiments, a color can be assigned based on an average color or a transformation of the color of the correlated pixels.

Figure 16:
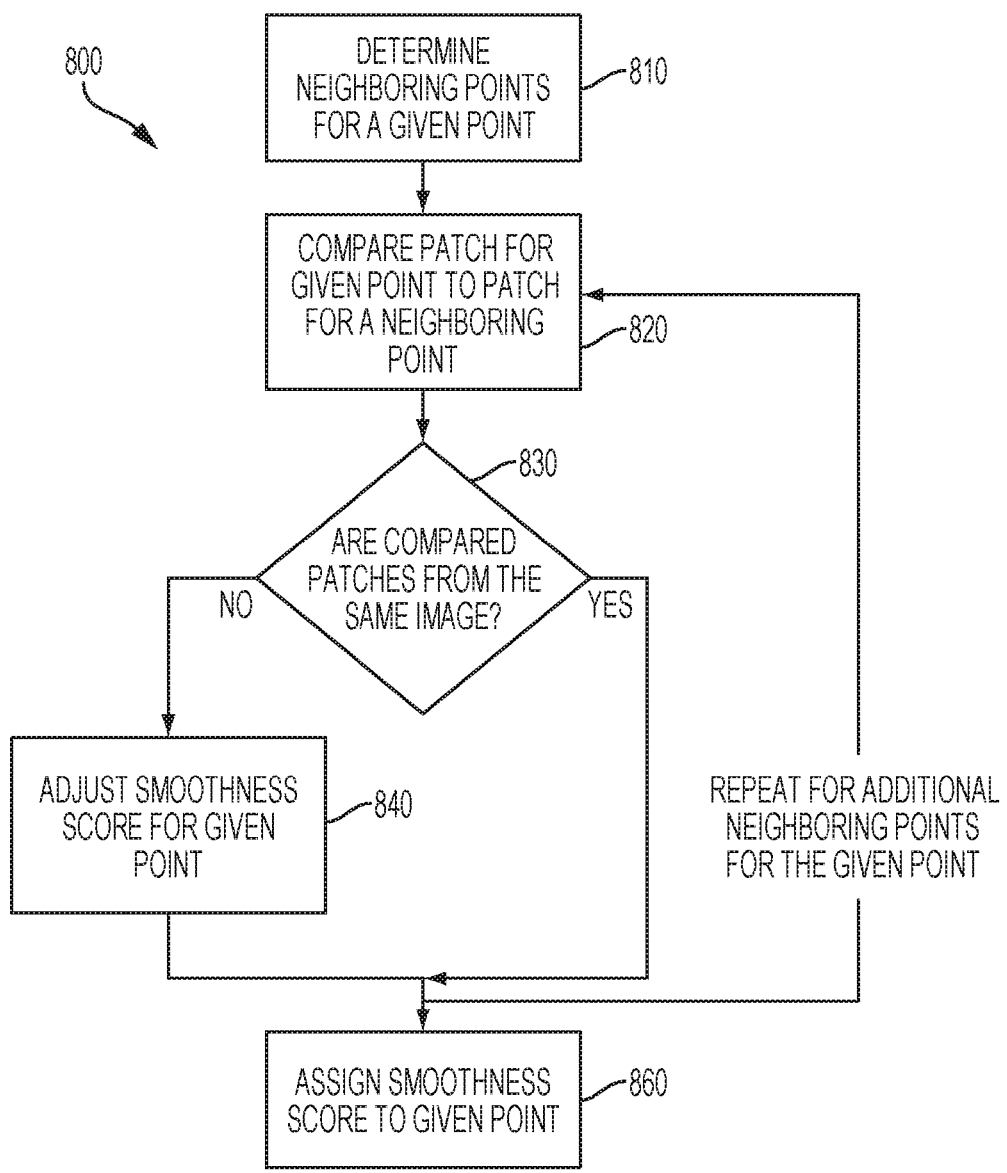
FIG. 16 is a flow chart depicting an example of a process for determining a smoothness score for a particular point within a digital 3D model, according to certain embodiments.

FIG. 16 is a flow chart depicting an example of a process 800 for determining a smoothness score for a particular point within a digital 3D model. In some embodiments, a scoring module 160 implements operations depicted in FIG. 16 by executing suitable program code. For illustrative purposes, the process 800 is described with reference to the examples depicted in FIGS. 1-15. Other implementations, however, are possible.

At block 810, the process 800 involves determining, for a given point, a group of neighboring points. In some embodiments, determining neighboring points for a point can be based on information describing one or more of the points, such as information extracted from a digital 3D model. In additional or alternative embodiments, determining neighboring points for a point can be based on analysis of one or more of the points, such as analysis to determine other points within a certain radius of the given point, or analysis to determine other points representing a same surface on the scanned target object.

At block 820, the process 800 involves comparing a patch selected for the given point with a patch selected for a neighboring point. As noted above regarding FIG. 1, the scoring module 160 can compare the selected patches 151 for the points in point set 133.

At block 830, the process 800 involves determining if the compared patches are extracted from a same image. For example, the scoring module 160 can determine if the patch for the neighboring point is extracted from a same image as the patch for the given point, such as an image from correlated color images 135. As described above regarding Eq. 3, a smoothness term can be calculated as 0 if the patches are extracted from the same image, and calculated as 1 if the patches are extracted from different images.

If the compared patches are not extracted from the same image, at block 840 the process 800 adjusts the smoothness score for the given point. For example, the smoothness score could be increased when the compared patches are not extracted from the same image. As described above regarding Eq. 3, the smoothness score can be calculated by summing the smoothness terms (e.g., 1's and 0's). The smoothness score can be increased when smoothness terms calculated as 1 are added to the adjusted smoothness score.

If the compared patches are extracted from the same image, process 800 either returns to block 820 to repeat blocks 820-840, or process 800 proceeds to block 850. Although not depicted, in some embodiments smoothness score can be adjusted in response to determining that the patches are extracted from the same image. For example, the smoothness score could be decreased if the patches are from the same image.

As noted above, the process 800 repeats blocks 820-840 for additional neighboring points of the given point. For example, a smoothness term can be determined for each of the neighboring points for the point, as described regarding Eq. 3.

At block 860, the process 800 involves assigning the determined smoothness score to the given point. As noted above regarding FIG. 1, the scoring module 160 can determine and assign the smoothness score 163 for one or more points from point set 133. For example, a smoothness score for the point can be determined as described regarding Eq. 3. In some embodiments, the process 800 is repeated for each given point, and a smoothness score can be determined for each point. For example, a smoothness score 163 can be determined for each point in the point set 133.

Figure 17:
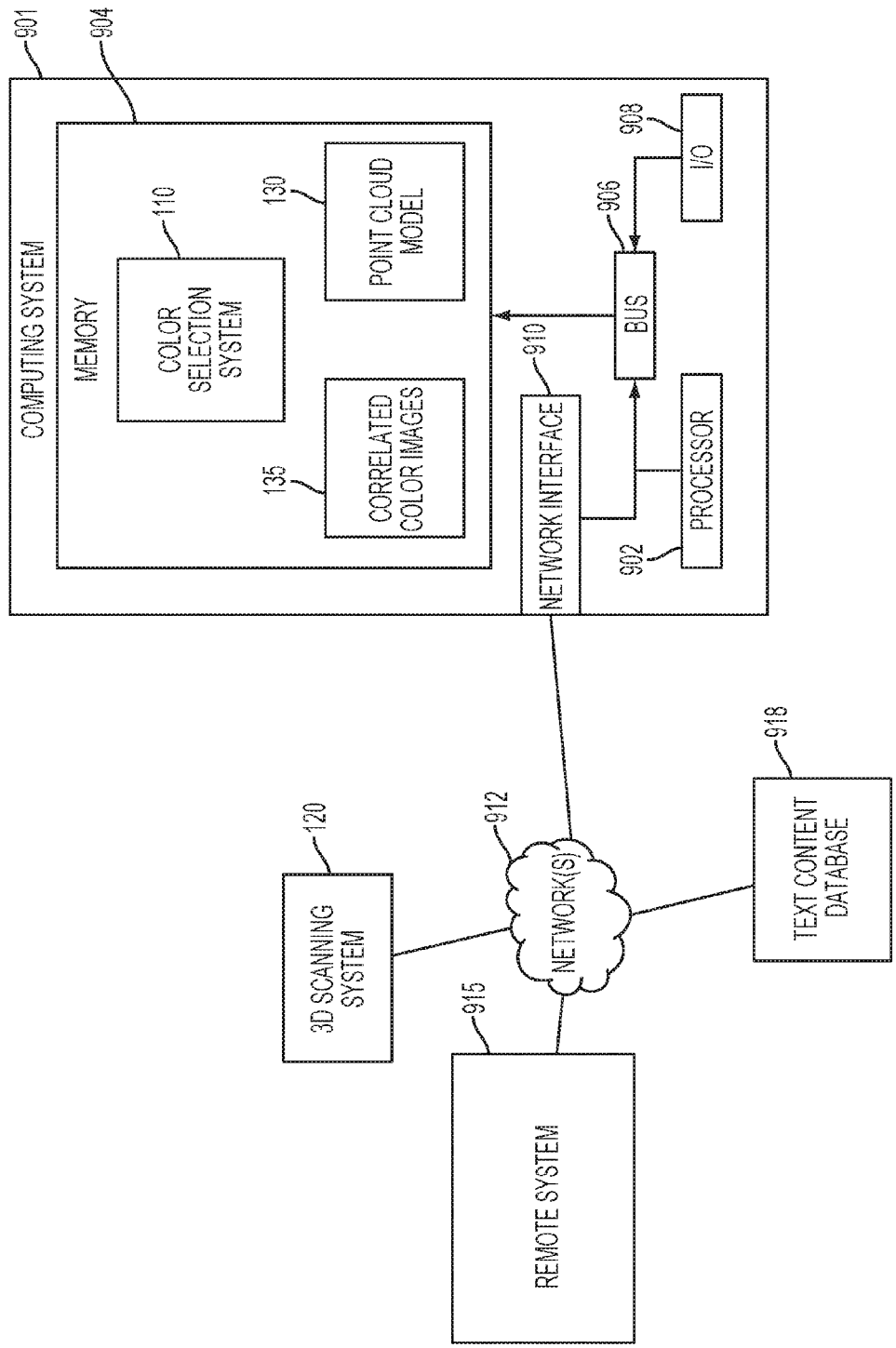
FIG. 17 is a block diagram depicting an example of an implementation of a computing system including a color selection system, according to certain embodiments.

Any suitable computing system or group of computing systems can be used for performing the operations described herein. For example, FIG. 17 is a block diagram depicting an example implementation of a color selection system according to certain embodiments.

The depicted example of a computing system 901 includes one or more processors 902 communicatively coupled to one or more memory devices 904. The processor 902 executes computer-executable program code or accesses information stored in the memory device 904. Examples of processor 902 include a microprocessor, an application-specific integrated circuit (ASIC), a field-programmable gate array (FPGA), or other suitable processing device. The processor 902 can include any number of processing devices, including one.

The memory device 904 includes any suitable non-transitory computer-readable medium for storing the color selection system 110, the correlated color images 135, the point cloud model 130, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 901 may also include a number of external or internal devices such as input or output devices. For example, the computing system 901 is shown with an input/output (I/O) interface 908 that can receive input from input devices or provide output to output devices. A bus 906 can also be included in the computing system 901. The bus 906 can communicatively couple one or more components of the computing system 901.

The computing system 901 executes program code that configures the processor 902 to perform one or more of the operations described above with respect to FIGS. 1-16. The program code includes operations related to, for example, one or more of the color selection system 110, the correlated color images 135, the point cloud model 130, or other suitable applications or memory structures that perform one or more operations described herein. The program code may be resident in the memory device 904 or any suitable computer-readable medium and may be executed by the processor 902 or any other suitable processor. In some embodiments, the program code described above, the color selection system 110, the correlated color images 135, and the point cloud model 130 are stored in the memory device 904, as depicted in FIG. 17. In additional or alternative embodiments, one or more of the color selection system 110, the correlated color images 135, the point cloud model 130, and the program code described above are stored in one or more memory devices accessible via a data network, such as a memory device accessible via a cloud service.

The computing system 901 depicted in FIG. 17 also includes at least one network interface 910. The network interface 910 includes any device or group of devices suitable for establishing a wired or wireless data connection to one or more data networks 912. Non-limiting examples of the network interface 910 include an Ethernet network adapter, a modem, and/or the like. A remote system 915 is connected to the computing system 901 via network 912, and remote system 915 can perform some of the operations described herein, such as storing color images or extracted patches. The computing system 901 is able to communicate with one or more of the remote computing system 915 and the 3D scanning system 120 using the network interface 910. Although FIG. 17 depicts the 3D scanning system 120 as connected to computing system 901 via the networks 912, other embodiments are possible, including the scanning system 120 running as a program in the memory 904 of computing device 901.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of selecting colors for a three-dimensional model to enhance realism of the three-dimensional model when rendered or printed, the method comprising:
receiving, for a scanned object, a digital three-dimensional (3D) model and color images;
extracting, from the color images, a plurality of candidate patches, wherein each candidate patch is correlated with a point in a set of points from the 3D model;
determining a quality measurement for each candidate patch, wherein the quality measurement quantifies a visual characteristic of the candidate patch;
assigning quality scores and smoothness scores to the set of points, wherein each quality score is assigned to a respective point in the set of points based on a quality measurement for a respective first candidate patch that is correlated with the respective point, and wherein each smoothness score quantifies a variation between the respective first candidate patch and a respective second candidate patch;
determining, for the set of points, an overall score based on the assigned quality scores and the assigned smoothness scores;
selecting, from the plurality of candidate patches, a set of representative patches based on the overall score, wherein the overall score indicates an optimized combination of the quality scores and smoothness scores; and
assigning, based on the set of representative patches, a color to each point in the set of points from the 3D model.

2. The method of claim 1, further comprising rendering the digital 3D model based on the set of points and the assigned color for each point.

3. The method of claim 1, wherein selecting the set of representative patches further comprises:
for each point in the set of points:
assigning, to the respective point, a second quality score based on the quality measurement for a third candidate patch that is correlated with the respective point,
assigning, to the respective point, a second smoothness score, wherein the second smoothness score quantifies a second variation between the third candidate patch and a fourth candidate patch;
determining, for the set of points, a second overall score based on the second quality scores and the second smoothness scores;
comparing the overall score with the second overall score; and
selecting the set of representative patches based on the comparison of the overall score to the second overall score, wherein the set of representative patches includes one of the combinations of: the first and second candidate patches, or the third and fourth candidate patches.

4. The method of claim 3, wherein selecting the set of representative patches further comprises:

determining, based on comparing the overall score to the second overall score, that a value of the overall score is lower relative to a value of the second overall score; and selecting the set of representative patches based on the determination that the value of the overall score is lower relative to the value of the second overall score, wherein the set of representative patches includes the first and second candidate patches.

5. The method of claim 1, wherein assigning the color to each point in the set of points further comprises at least one of:

assigning to the respective point a first color, the first color associated with a pixel included in a representative patch included in the set of representative patches, the pixel correlated with the respective point, assigning to the respective point a second color, the second color being an average color determined from multiple colors associated with multiple pixels included in the representative patch, the multiple pixels correlated with the respective point; or assigning to the respective point a third color, the third color determined from a transformation of multiple colors associated with multiple pixels included in the representative patch, the multiple pixels correlated with the respective point.

6. The method of claim 1, wherein assigning the smoothness score further comprises:

comparing the first candidate patch to the second candidate patch, the second candidate patch being is correlated with a neighboring point;

determining, based on the comparison of the first candidate patch to the second candidate patch, that the second candidate patch is from a same color image as the first candidate patch; and assigning the smoothness score based on the determination that the second candidate patch is from the same color image as the first candidate patch.

7. The method of claim 1, wherein determining the overall score further comprises:

determining an aggregate quality score based on a set of quality scores for the set of points;

determining an aggregate smoothness score based on a set of smoothness scores for the set of points; and determining the overall score based on a linear combination of the aggregate quality score and the aggregate smoothness score.

8. The method of claim 1, further comprising, for each color image:

determining that at least one candidate patch extracted from the color image is selected as a representative patch for at least one point in the set of points;

assigning a uniqueness score to the color image based on the determination that the at least one candidate patch is selected as the representative patch for the at least one point.

9. The method of claim 8, wherein determining the overall score further comprises:

determining an aggregate uniqueness score based on the uniqueness scores for each color image; and determining the overall score based on a linear combination of the aggregate uniqueness score, the assigned quality scores, and the assigned smoothness scores.

10. A system for selecting colors for three-dimensional models to enhance realism of three-dimensional models when rendered or printed, the system comprising:

a three-dimensional (3D) scanning system, a memory, and a processor for executing instructions stored in a computer-readable medium, wherein when executed by the processor, the instructions perform operations comprising:

receiving, for a scanned object, a digital three-dimensional (3D) model and color images;

extracting, from the color images, a plurality of candidate patches, wherein each candidate patch is correlated with a point in a set of points from the 3D model;

determining a quality measurement for each candidate patch, wherein the quality measurement quantifies a visual characteristic of the respective candidate patch;

for each point in the set of points, selecting a first candidate patch that is correlated with the respective point and a second candidate patch that is correlated with the respective point;

determining, for the set of points, a first overall score indicating an evaluation of the selected first candidate patches, the first overall score based on first quality scores and first smoothness scores, the first quality scores and first smoothness scores based on the selected first candidate patches;

determining, for the set of points, a second overall score indicating an evaluation of the selected second candidate patches, the second overall score based on second quality scores and second smoothness scores, the second quality scores and second smoothness scores based on the selected second candidate patches;

comparing the first overall score to the second overall score;

determining, based on comparing the first overall score to the second overall score, that a value of the first overall score is lower relative to a value of the second overall score;

selecting, from the candidate patches and based on the determination that the value of the first overall score is lower relative to the value of the second overall score, a set of representative patches based on the first overall score, wherein the set of representative patches includes the first candidate patches;

assigning, based on the set of representative patches, a color to each point from the 3D model.

11. The system of claim 10, wherein determining the first overall score further comprises:

assigning the first quality scores and the first smoothness scores to the set of points, wherein each first quality score is assigned to a respective point in the set of points based on the quality measurement for the respective first candidate patch that is correlated with the respective point, and wherein each first smoothness score quantifies a variation between the respective first candidate patch and another candidate patch.

12. The system of claim 11, wherein assigning the first smoothness scores further comprises:

comparing the respective first candidate patch correlated with the respective point to the first candidate patch correlated with a neighboring point;

determining, based on the comparison of the respective first candidate patch correlated with the respective point to the first candidate patch correlated with the neighboring point, that the first candidate patch correlated with the neighboring point is from a same color image as the respective first candidate patch correlated with the respective point; and
assigning a respective first smoothness score to the respective point based on the determination that the first candidate patch correlated with the neighboring point is from the same color image as the respective first candidate patch correlated with the respective point.

13. The system of claim 10, wherein determining the first overall score further comprises:
determining an aggregate quality score based on the first quality scores for the set of points;
determining an aggregate smoothness score based on the first smoothness scores for the set of points; and
determining the first overall score based on a linear combination of the aggregate quality score and the aggregate smoothness score.

14. The system of claim 10, further comprising, for each color image:
determining that at least one candidate patch extracted from the color image is selected as the first candidate patch for at least one point in the set of points;
assigning a uniqueness score to the color image based on the determination that the at least one candidate patch is selected as the first candidate patch for the at least one point.

15. The system of claim 14, wherein determining the first overall score further comprises:
determining an aggregate uniqueness score based on the uniqueness scores for each color image; and
determining the first overall score based on the selected first candidate patches and the aggregate uniqueness score.

16. A non-transitory computer-readable medium on which is encoded program code for selecting colors for three-dimensional models to enhance realism of three-dimensional models when rendered or printed, the program code comprising:
program code for receiving, for a scanned object, a digital three-dimensional (3D) model and color images;
program code for extracting, from the color images, a plurality of candidate patches, wherein each candidate patch is correlated with a point in a set of points from the 3D model;
program code for determining a quality measurement for each candidate patch, wherein the quality measurement quantifies a visual characteristic of the respective candidate patch;
program code for assigning quality scores and smoothness scores to the set of points, wherein each quality score is assigned to a respective point in the set of points based on a quality measurement for a respective first candidate patch that is correlated with the respective point, and wherein each smoothness score quantifies a variation between the respective first candidate patch and a respective second candidate patch;
program code for determining, for the set of points, an overall score based on the assigned quality scores and the assigned smoothness scores;
program code for selecting, from the candidate patches, a set of representative patches based on the overall score, wherein the overall score indicates an optimized combination of the quality scores and smoothness scores; and
program code for assigning, based on the set of representative patches, a color to each point from the 3D model.

17. The computer-readable medium of claim 16, wherein the program code for selecting the set of representative patches further comprises:
for each point in the set of points:
program code for assigning, to the respective point, a second quality score based on the quality measurement for a third candidate patch that is correlated with the respective point,
program code for assigning, to the respective point, a second smoothness score, wherein the second smoothness score quantifies a second variation between the third candidate patch and a fourth candidate patch;
program code for determining, for the set of points, a second overall score based on the second quality scores and the second smoothness scores;
program code for comparing the overall score with the second overall score; and
program code for selecting the set of representative patches based on the comparison of the overall score to the second overall score, wherein the set of representative patches includes one of the combinations of: the first and second candidate patches, or the third and fourth candidate patches.

18. The computer-readable medium of claim 17, wherein the program code for selecting the set of representative patches further comprises:
program code for determining, based on comparing the overall score to the second overall score, that a value of the overall score is lower relative to a value of the second overall score; and
program code for selecting the set of representative patches based on the determination that the value of the overall score is lower relative to the value of the second overall score, wherein the set of representative patches includes the first and second candidate patches.

19. The computer-readable medium of claim 16, wherein the program code for assigning the smoothness score further comprises:
program code for comparing the first candidate patch to a second candidate patch that is correlated with a neighboring point;
program code for determining, based on the comparison of the first candidate patch to the second candidate patch, that the second candidate patch is from a same color image as the first candidate patch; and
program code for assigning the smoothness score to the point based on the determination that the second candidate patch is from the same color image as the first candidate patch.

20. The computer-readable medium of claim 16, further comprising:
program code for determining, for each color image, that at least one candidate patch extracted from the color image is selected as a representative patch for at least one point in the set of points, and program code for assigning a uniqueness score to the color image based on the determination that the at least one candidate patch is selected as the representative patch for the at least one point;
program code for determining an aggregate uniqueness score based on the uniqueness scores for each color image; and
program code for determining the overall score based on a linear combination of the aggregate uniqueness score, the assigned quality scores, and the assigned smoothness scores.

* * * * *